(12) United States Patent
Nagasuka et al.

(10) Patent No.: US 7,146,462 B2
(45) Date of Patent: Dec. 5, 2006

(54) STORAGE MANAGEMENT METHOD

(75) Inventors: Hirofumi Nagasuka, Sagamihara (JP); Katsuhisa Miyata, Yokohama (JP); Masaru Satou, Yokohama (JP); Kenichi Oyamada, Yokohama (JP); Nobuyuki Osaki, Campbell, CA (US)

(73) Assignee: Hitachi, Ltd., Tokyo (JP)

( * ) Notice: Subject to any disclaimer, the term of this patent is extended or adjusted under 35 U.S.C. 154(b) by 434 days.

(21) Appl. No.: 10/804,942

(22) Filed: Mar. 18, 2004

(65) Prior Publication Data
US 2004/0250007 A1 Dec. 9, 2004

(30) Foreign Application Priority Data
May 20, 2003 (JP) ............................. 2003-142184

(51) Int. Cl.
*G06F 13/10* (2006.01)
(52) U.S. Cl. ..................................... 711/114
(58) Field of Classification Search ................ 711/114, 711/170, 173
See application file for complete search history.

(56) References Cited

U.S. PATENT DOCUMENTS

| | | | |
|---|---|---|---|
| 4,843,543 A | 6/1989 | Isobe | |
| 4,985,828 A | 1/1991 | Shimizu et al. | |
| 5,319,758 A | 6/1994 | Arai et al. | |
| 5,915,067 A | 6/1999 | Nonomura et al. | |
| 6,529,944 B1 | 3/2003 | LeCrone | |
| 6,557,073 B1 | 4/2003 | Fujiwara et al. | |
| 2003/0079074 A1 | 4/2003 | Sicola et al. | |
| 2004/0103244 A1* | 5/2004 | Fujimoto et al. | 711/113 |
| 2004/0133752 A1 | 7/2004 | Suzuki et al. | |
| 2005/0091455 A1* | 4/2005 | Kano et al. | 711/114 |

FOREIGN PATENT DOCUMENTS

JP 2002-132552 5/2002

* cited by examiner

*Primary Examiner*—Kevin L. Ellis
(74) *Attorney, Agent, or Firm*—Townsend and Townsend and Crew LLP

(57) ABSTRACT

A computer system includes a host computer, a disk control device controlling operation of a storage sub-system, and a management server managing configuration of the storage sub-system. The host computer registers the result of grouping of a plurality or volumes in the storage sub-system according to a use purpose in a volume management table including a volume identifier, a physical address, and a group identifier allocated in the disk control unit. During access to the volume via the host, the disk control unit obtains the physical address belonging to a storage belonging to a group identical to the group input via the host, notifies information described on the volume list of the storage allocated at the physical address to the management server, and causes the server to display the information.

2 Claims, 6 Drawing Sheets

FIG. 2

410 VOLUME LIST

| VOLUME IDENTIFIER | NUMBER OF ENTRIES | FILE 1 | HEAD ADDRESS | LENGTH | FILE 2 | HEAD ADDRESS | LENGTH | ... |
|---|---|---|---|---|---|---|---|---|
| 411 | 412 | 413 | 414 | 415 | 416 | 417 | 418 | |

320 VOLUME MANAGEMENT TABLE

| VOLUME IDENTIFIER (321) | PHYSICAL ADDRESS (322) | GROUP (323) |
|---|---|---|
| VOL1 | 1 | A |
| VOL2 | 2 | A |
| VOL3 | 3 | B |
| VOL4 | 4 | B |

STORAGE MANAGEMENT METHOD

BACKGROUND OF THE INVENTION

The present invention relates to a storage device management method in a computer system, a computer system, a storage device, and a management computer, particularly, to a method for managing a storage device in a computer system capable of effectively grasping the storage device use state and the file allocation information.

Recently, the computer system size has been increased and various programs for business have begun to be used. So, the I/O device of the computer system should effectively operate a plenty of data of various types. For this, the computer system should have a function to acquire the storage device use state and the file allocation information stored in a storage device effectively.

As for the method for reducing the overhead required for acquiring information such as the use state of the storage device via the aforementioned I/O device, for example, there is a conventional technique disklosed in JP-A-2002-132552. According to this conventional technique, a cache memory provided in the disk control unit of the storage device stores a volume list and a catalogue file as file allocation information. Moreover, physical region data is resident in the cache memory and the resident state can be released.

In the aforementioned conventional technique, the volume list is stored in the cache memory, which is not accompanied by the I/O operation to/from the disk device of the storage device and accordingly, it becomes possible to acquire the volume list information with low overheads. Moreover, since the catalogue managing the entire system file information can be handled as a type of file, the aforementioned conventional technique can acquire the catalog information with low overheads like the volume list.

SUMMARY OF THE INVENTION

However, the aforementioned conventional technique has no consideration on increase of the overheads required for information acquisition due to increase of the number of devices accompanying the increase of the computer system size.

Since the volume list exists on a storage device basis, the aforementioned conventional technique has a problem that as the number of storage devices used increases, the overheads required for information acquisition increase. Especially in the aforementioned conventional technique, information is acquired via a host computer and there may arise a problem of deteriorating the throughput or response time of work executed in the host computer.

In the aforementioned conventional technique, the catalog file also has a problem that increase of the overhead required for information acquisition accompanying the catalogue file size is expected as the system size increases. Moreover, as the system size increases, not only the catalog for managing the entire computer system is generated but also a great number of catalog files are generated according to the work and use purpose. The aforementioned conventional technique has a problem that such an increase of the number of catalog files also causes the increase of overheads required for information acquisition.

It is therefore an object of the present invention to provide a storage management method for a computer system including a host computer, a storage sub-system having one or more volumes, a disk control unit provided in the storage sub-system for controlling operation of the storage sub-system, and a management computer for managing configuration of the storage sub-system, the method comprising steps of: registering, by the host computer, a volume identifier, a physical address, and a group identifier of the storage sub-system in the disk management table in the disk control unit as a result of grouping of the volumes in the storage sub-system according to a use purpose; obtaining, by the disk control unit, a physical address of a volume belonging to a same group as a group input from the management computer and notifying information described in a volume list of a volume allocated at the physical address to the management computer; and displaying, by the management computer, the information thus notified.

According to another aspect of the invention, there is provided a computer system including a host computer, a storage sub-system having one or more volumes, a disk control unit provided in the storage sub-system for controlling operation of the storage sub-system, and a management computer for managing configuration of the storage sub-system, wherein the host computer has a unit for registering in the disk management table in the disk control units a volume identifier, a physical address, and a group identifier of storage sub-system as a result of grouping of volumes in the storage sub-system according to a use purpose; the disk control unit has a unit for obtaining a physical address of a volume belonging to a same group as a group input from the management computer and notifying information described in a volume list of a volume allocated at the physical address to the management computer; and the management computer has a unit for displaying the information thus notified.

According to still another aspect of the present invention, there is provided a storage device comprising one or more volumes and a disk control unit; wherein the disk control unit may include a disk management table for storing a volume identifier, a physical address, and a group identifier of the storage device as a result of grouping of volumes in the storage device according to a use purpose and a unit for obtaining a physical address of a volume belonging to a same group as a group transmitted from the management computer, and notifying information described in a volume list of a volume allocated at the physical address to the management computer.

According to yet another aspect of the present invention, there is provided a management computer comprising: a plurality of pairs of one or more volumes and a disk control unit for managing configuration of a storage device used by a host computer. The computer may include: a unit for storing information described in a disk management table in a disk control unit transmitted from respective disk control units together with identifiers of the disk control units in the storage device accessible by the management computer; a unit for requesting the disk control device to which the volume corresponding to a requested group or a requested volume identifier belongs to acquire information on a volume list concerning a volume belonging to the group or the volume thus requested; and a unit used according to information on a volume list as a response to this request for updating an information file of the disk management table stored in the storage device to the disk management table information thus notified.

Other objects, features and advantages of the invention will become apparent from the following description of the embodiments of the invention taken in conjunction with the accompanying drawings.

BRIEF DESCRIPTION OF THE DRAWINGS

FIG. 2 explains a configuration example of a volume list stored in each volume.

DESCRIPTION OF THE EMBODIMENTS

Figure 1:
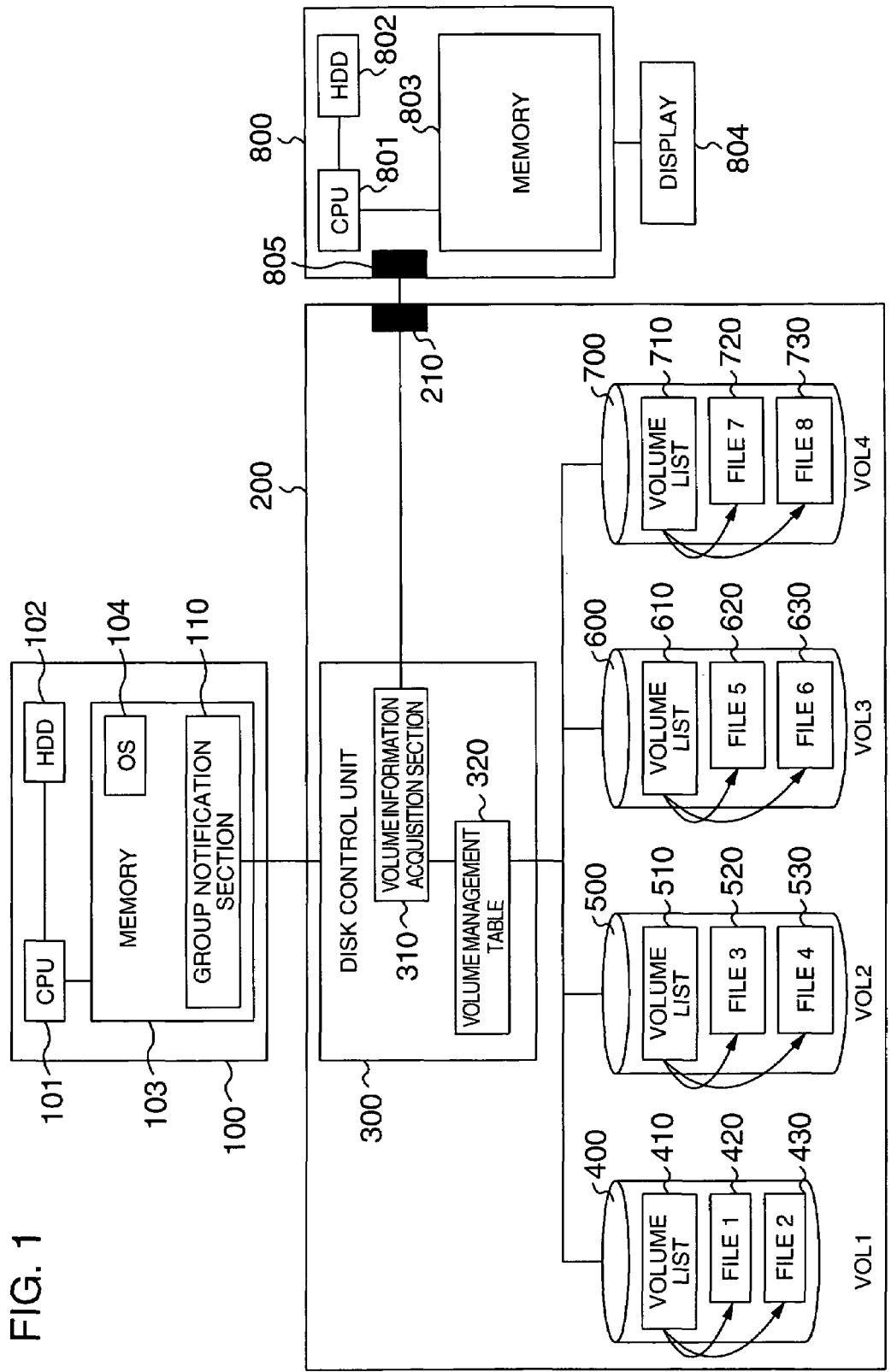
FIG. 1 is a block diagram showing a configuration example of a computer system according to a first embodiment.

FIG. 1 is a block diagram showing a configuration example of a computer system according to a first embodiment. In FIG. 1, 100 represents a host computer; 101 and 801 represent CPUs; 102 and 802 represent hard disk drives (HDD); 103 and 803 represent memories; 110 represents a group notification section; 200, a storage sub-system; 300, a disk control device; 310, a volume information acquisition section; 320, a volume management table; 400, 500, 600, and 700, volumes; 410, 510, 610, and 710, volume lists; 420, 430, 520, 530, 620, 630, 720, and 730, files 1 to 9; 800, a management computer (hereinafter, referred to as a management server); 804, a display.

The computer system according to the first embodiment includes a host computer 100 for executing a work processing instructed from an external device, a storage sub-system 200 as a storage device containing data handled by the work processing, and a management server 800 for controlling configuration of the storage sub-system 200.

The storage sub-system is connected to the management server 800 by an adapter 210 and a dedicated line via an adapter 805. By using predetermined protocol, the management server 800 sends a request content concerning the information to be acquired to the storage sub-system 200 and the storage sub-system 200 sends information to be acquired and notified to the management server.

The storage sub-system 200 includes a plurality of volumes, e.g., four volumes 400, 500, 600, and 700 in the example of the figure, and a disk control unit 300 for controlling them. It should be noted that, although not depicted, the storage sub-system 200 has one or more disk devices to be connected to the disk control unit 300. Here, the disk device is a storage device having a non-volatile storage medium such as a hard disk drive (HDD). A plurality of volumes provided on the storage sub-system are virtual storage regions. One volume may consist of a physical storage regions of one disk device or physical storage regions of a plurality of disk devices. The disk control unit 300 includes a volume management table 320 for storing information on the volumes 400, 500, 600, and 700 to be managed and a volume information acquisition section 310 for deciding the volume for information acquisition from the information on the volume management table 320, acquiring necessary information, and notifying it to the management server 800. Moreover, the disk control unit 300 includes a CPU and a memory although not depicted. The volume information acquisition section 310 may be dedicated hardware or a program executed on a CPU. Each of the volumes 400, 500, 600, and 700 contains files 1 to 8 indicated by the reference symbols 420, 430, 520, 530, 620, 630, 720, and 730. Predetermined positions of the respective volumes 400, 500, 600, and 700 contain volume lists 410, 510, 610, and 710 which register information of respective files are stored in the respective volumes. The volume lists 410, 510, 610, and 710 describe the file name, file allocation destination, and capacity.

The host computer 100 is an ordinary computer having a CPU 101, an HDD 102, and a memory 103. The host computer 100 executes work under control of a work processing program and an OS 104 stored in the HDD 102 and loaded in the memory 103. The group notification section 110 is realized by the program stored in the memory 103. In the computer system using a plenty of storage devices, particular storage devices are used for particular work purposes such as reading and registering human resources and bookkeeping. In this embodiment, the host computer 100 has a group notification section 110. By using the group notification section 110, the host computer 100 divides the volumes 400, 500, 600, and 700 into a plurality of groups of work units or use purpose units and notifies it to the storage sub-system 200. The storage sub-system 200 registers the information concerning the notified group in the volume management table 320.

FIG. 2 is a diagram explaining a configuration example of the volume list 410, 510, 610, and 710 stored in the volumes 400, 500, 600, and 700. Here, explanation will be given on an example of the volume list 410. It should be noted that identifiers VOL1, VOL2, VOL3, and VOL4 are assigned to the respective volumes 400, 500, 600, and 700.

The volume list 410 has fields as explained below. That is, 411 represents a field for storing the volume identifier and here a character string VOLL is stored. 412 is a field for storing the entry count managed by the volume list 410. In this case, "2" is stored. In other words, the entry count means the number of files stored in the volume 400. 413, 414, and 415 store information concerning the file 1. 413 contains the file name of file 1; 414 contains the storage destination head address; and 415 contains the length of the file 1. Similarly, 416, 417, and 418 contain information concerning file 2. 416 contains the file name of file 2; 417 contains the storage destination head address; and 418 contains the length of file 2.

Figures 3, 4:
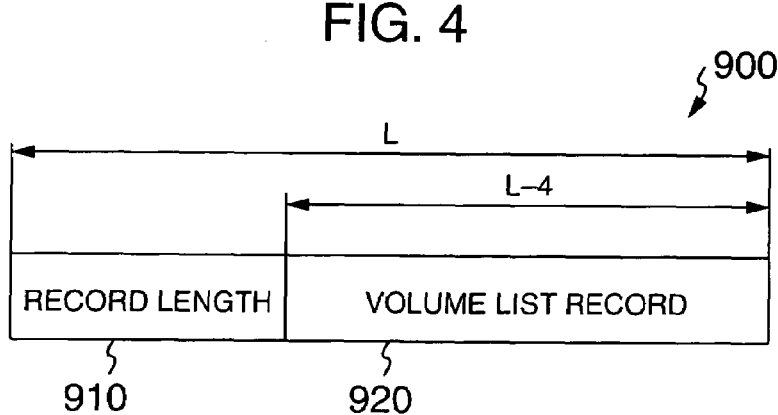
FIG. 3 explains configuration of a volume management table provided in a disk control unit.
FIG. 4 explains an information format example notified to a management server by a volume information acquisition section of the disk control unit.

FIG. 3 is a diagram explaining a configuration example of the volume management table 320 provided in the disk control unit.

The volume management table 320 is a table for managing the volume management information in the storage sub-system 200. The volume management table 320 has a field 321 for storing a volume identifier a field 322 for storing the physical address indicating the storage position of the volume in the disk device, and a field 323 for storing the group name to which an identifier is assigned by the group notification section 110. Here, for VOL1, information on the physical address 1 and group name "A" is stored. Moreover, for VOL2, information on the physical address 2 and the group name "A" is stored. For VOL3, information on the physical address 3 and the group name "B" is stored. Furthermore, for VOL4, information on the physical address 4 and the group name "B" is stored. The volume identifier and information on the physical address are notified from the host computer 100 to the storage sub-system 200 during initialization of the disk control unit 300 at the starting of the computer system. On the other hand, the group information is notified by the host computer 100 to the storage sub-system 200 by using the group notification section 110 after the starting of the computer system.

FIG. 4 is a diagram explaining a format example of information notified by the volume information acquisition section of the disk control unit to the management server.

To the management server 800, contents of the volume lists 410, 510, 610, and 710 are notified as information on the desired volumes 400, 500, 600, and 700. For this, the information notified by the volume information acquisition section of the disk control unit 300 to the management server includes the record length 910 and the volume list record 920 like the format shown in FIG. 4. As the record length, the record length (L bytes) of the notification format is stored. As the volume list record 920, the volume lists 410, 510, 610, and 710 explained by FIG. 2 are stored. The field length of the volume list record 920 is (L−4) bytes since the field length of the record length is 4 bytes.

Figure 5:
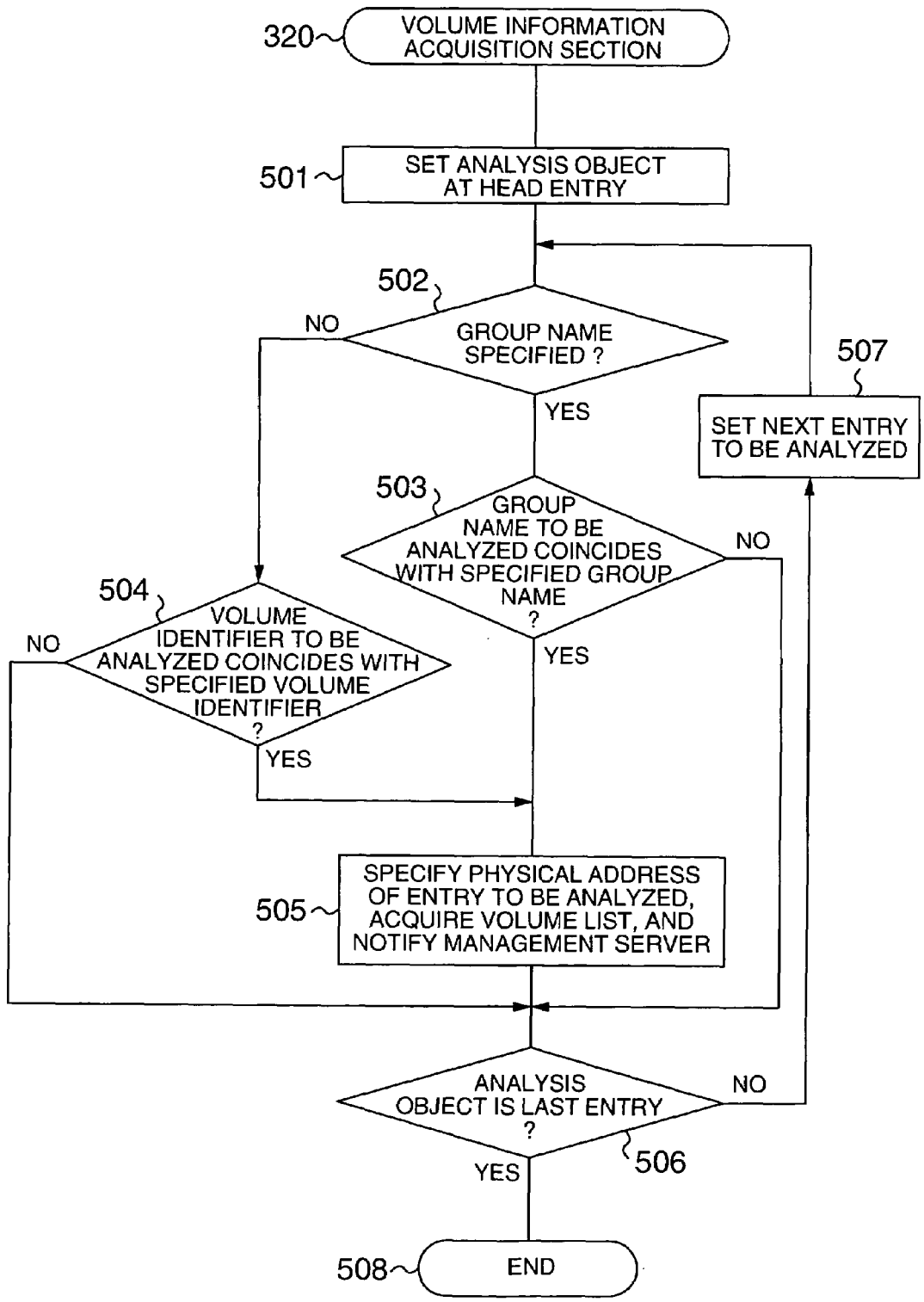
FIG. 5 is a flowchart explaining a processing operation of a volume information acquisition section of the disk control unit.

FIG. 5 is a flowchart explaining the processing operation of the volume information acquisition section of the disk control unit 300. A user inputs a volume identifier or a group name as input information to the management computer 800 from an external device not depicted in FIG. 1. The management computer 800 acquires information (such as volume list) corresponding to the volume identifier input from the volume information acquisition section 310 and notifies it to the user. Hereinafter, the processing will be detailed.

(1) The volume information acquisition section 310 which has received information on the volume identifier or the group name from the management server 800 firstly acquires the head entry of the volume management table 320 as an object for analysis (step 501). Moreover, judgement is made to decide whether the input information from the management computer 800 is a group name (step 502).

(2) If step 502 decides that the input information is a group name, the volume information acquisition section 310 decides whether the group name as an analysis object acquired from the volume management table 320 coincides with the group name specified as the input information (step 503).

(3) If step 502 decides that the input information is not a group name, i.e., the input information is a volume identifier, the volume information acquisition section 310 judges whether the volume identifier of an analysis object acquired from the volume management table 320 coincides with the volume identifier specified (step 504).

(4) When the group name of the analysis object coincides with the group name if the input information in step 503, or when the volume identifier of the analysis object coincides with the volume identifier of the input information in step 504, the volume information acquisition section 310 acquires the physical address stored in the field 322 of the analysis object entry. After this, the disk control unit 300 uses the acquired physical address to perform an output operation and acquires information on the volume lists 410, 510, 610, and 710 stored in the volumes. The volume information acquisition section 310 transfers the acquired information using the format explained in FIG. 4 to the management server 800 via a communication line connecting the storage sub-system 200 and the management server. The management server 800 which has acquired the information displays the acquired information on its display 804 (step 505).

(5) In steps 503 and 504, when the group name of the analysis object does not coincide with the group name of the input information or when the volume identifier of the analysis object does not coincide with the volume identifier of the input information or after the processing of step 505, the volume information acquisition section 310 decides whether the entry as the current analysis object is a final entry of the volume management table 320 (step 506).

(6) When step 506 decides that the entry as the current analysis object is not the final entry, the volume information acquisition section 310 selects the next entry as the analysis object and returns to step 501 to repeat the processing. On the other hand, when the entry as the current analysis object is the final entry, the volume information acquisition section 310 terminates the processing (steps 507, 508).

The processing of this embodiment can be composed as a processing program which can be provided by being stored in a recording medium such as an HD, DAT, FD, MO, DVD-ROM, and CD-ROM.

Figure 6:
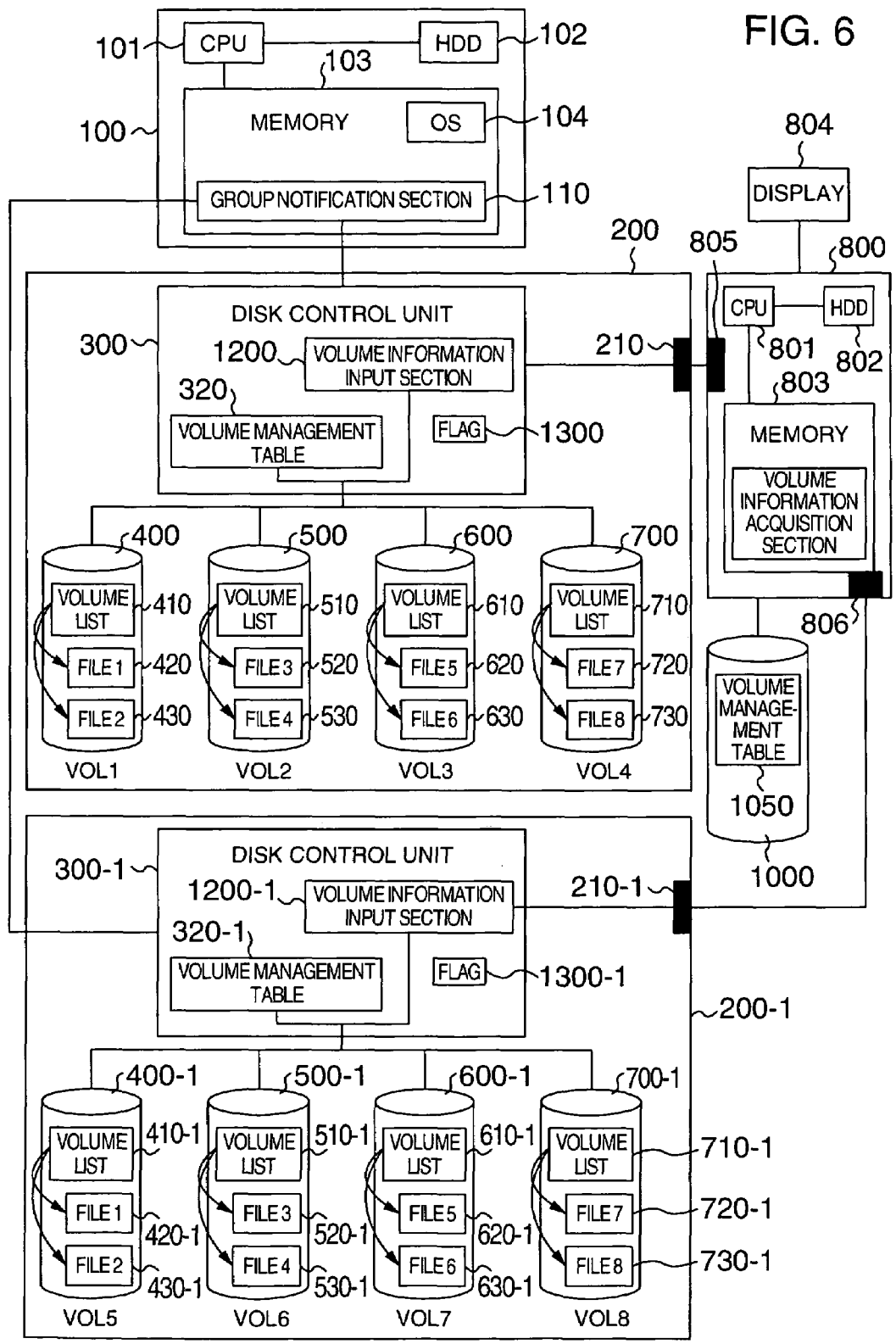
FIG. 6 is a block diagram showing a configuration example of the computer system according to a second embodiment.

FIG. 6 is a block diagram showing a configuration example of a computer system according to a second embodiment. In FIG. 6, 1000 represents a storage device; 1050, a volume management table; 1200, 1200-1, volume information acquisition sections; 1300, 1301, update flags; the other reference symbols are identical as in FIG. 1. Moreover, those which have "-1" are identical or equivalent to those indicated by the reference symbol preceding "-1" in FIG. 1 and FIG. 6.

The second embodiment is a computer system in which one host computer 100 can use two storage sub-systems 200 and 200-1. Here, volume management tables 320 and 320-1 are provided in the respective disk control units 300 and 300-1 of the two storage sub-systems 200 and 200-1. Accordingly, it becomes difficult to analyze the volume management table.

To cope with this, in the second embodiment, there is provided a storage device 1000 which can be accessed by the management server 800. In the computer system, the contents of the volume management tables 320 and 320-1 are collected as the file in the storage device 1000 in the volume management table 1050.

The data transmission and reception are realized by the transfer using a dedicated line in the same way as in the first embodiment. In FIG. 6, the adapter 210 of the storage sub-system is connected to the adapter 805 of the management server 800 via a dedicated line. Moreover, the adapter 210-1 of the storage sub-system 200-1 is connected to the adapter 805 of the management server 800 via a dedicated line. By using these dedicated lines, information transmission and reception are realized between the storage sub-systems 200, 200-1, and the management computer 800 according to a predetermined protocol.

Furthermore, in the second embodiment, the volume information acquisition section 310 provided in the disk control unit 300 in the first embodiment is arranged in the management server 800 and analysis is performed by using the volume management table 1050. For this, the disk control units 300 and 300-1 have volume information input sections 1200 and 1200-1, respectively for inputting volume information into the volume management table 1050 provided in the management server 800.

When a volume satisfying the search condition is present, the volume information acquisition section 310 transmits information on the physical address of the volume to the volume information input sections 1200 and 1120-1 and requests for acquisition of the information on the volume list.

In the second embodiment, during operation of the computer system the volume management tables 320 and 320-1 in the disk control units 310 and 310-1 are updated by the group notification section 110 of the host computer 100. In this case, the latest information update is not executed in the volume management table 1050 on the storage device 1000 of the management server 800. To cope with this, update flags 1300 and 1300-1 are arranged in the disk control units 310 and 310-1. When the volume management tables 320 and 320-1 are updated, the disk control units 300 and 300-1 turn ON this flag. When the volume information input sections 1200 and 1200-1 receive an information acquisition request from the volume information acquisition section 310 of the management server 800, the volume information input sections 1200 and 1200-1 notify the information on the volume management tables 320 and 320-1 to the volume information acquisition section 310 and turn OFF the update flags 1300 and 1300-1. The volume acquisition section 310 which has received the information updates the volume management table 1050 according to the information. Thus, the volume management table 1050 can hold the latest information.

Figure 7:
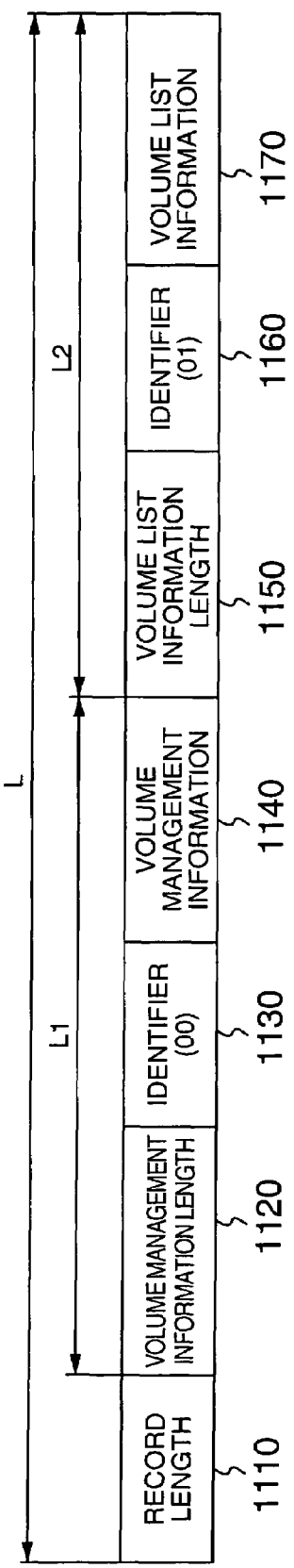
FIG. 7 is a diagram explaining a format example of data input to the volume information acquisition section of the management server from the volume information input section.

FIG. 7 explains a format example for data input from the volume information input section to the volume information acquisition section of the management server.

The data format 1100 shown in FIG. 7 has a field for storing the record length 1110 indicating the entire record length and a field for storing the volume management information and the volume list information. More specifically, the contents registered in the fields 1120, 1130, and 1140 indicate the volume management information. The field 1120 indicates the entire length of the volume management information (L1 bytes), and the field 1130 is a record identifier indicating the volume management information. In this example, "00" is stored. Moreover, the field 1140 stores the latest volume management information. It should be noted that there is a case that the volume management information is unnecessary. In this case, the field 1120 indicating the entire length of the volume management information stores the sum of the length of the fields 1120 and 1130.

Moreover, in the fields 1150, 1160, and 1170, the volume lists information is stored. The field 1150 stores the entire length (L2 bytes) of the volume list information and the field 1160 stores a record identifier indicating the volume list information, which is "01" in this example. Furthermore, the field 1170 contains the main body of the latest volume list information.

According to the aforementioned embodiments, in the computer system having an increasing storage capacity of the storage device used and an increasing number of storage devices as the system size increases, it is possible to effectively acquire the storage device information such as information on the storage device use condition and information on the files stored without increasing the load on the host computer.

As has been described above, according to the present invention, it is possible to acquire information for managing the large-scale storage system use condition without increasing the load on the host computer.

It should be further understood by those skilled in the art that although the foregoing description has been made on embodiments of the invention, the invention is not limited thereto and various changes and modifications may be made without departing from the spirit of the invention and the scope of the appended claims.

What is claimed is:

1. A storage system management method for a computer system including a host computer, a storage sub-system having one or more volumes, a disk control unit provided in the storage sub-system for controlling operation of the storage sub-system, and a management computer for managing configuration of the storage sub-system, the method comprising:

registering, by the host computer, a volume identifier, a physical address, and a group identifier of the storage sub-system in a disk management table in the disk control units as a result of grouping of volumes in the storage sub-system according to a use purpose;

obtaining, by the disk control unit, a physical address of a volume belonging to a same group as a group identifier input from the management computer from the disk management table, and notifying information described in a volume list of a volume allocated at the physical address to the management computer;

displaying, by the management computer, the information thus notified;

storing, by the management computer, information stored in the disk management table together with a disk control unit identifier from respective disk control units to a storage device accessible by the management computer;

deciding, by the management computer, a disk control unit to which a volume corresponding to a requested group or a volume identifier belongs, according to information stored in an accessible storage device, and requesting the disk control unit thus decided to acquire information on a volume list concerning a volume belonging to the requested group or volume identifier; and notifying, by the disk control unit thus requested, information described in a volume list of a volume identical to a group or a volume identifier specified by the management computer to the management computer.

2. The storage system management method according to claims 1, further comprising:

notifying, by the disk control unit, information requested to be acquired from the management computer to the management computer, and notifying new information on the disk management table to the management computer; and updating, by the management computer thus notified, an information file of the disk management table stored in the storage device accessible by the management computer to the disk management table information thus notified.

* * * * *